US012783588B2

(12) United States Patent
Bensberg et al.

(10) Patent No.: US 12,783,588 B2
(45) Date of Patent: Nov. 3, 2026

(54) MAINTAINING DOCUMENT COUNT IN A DISTRIBUTED SYSTEM

(71) Applicant: SAP SE, Walldorf (DE)

(72) Inventors: Christian Bensberg, Heidelberg (DE); Frederik Transier, Bammental (DE); Kai Stammerjohann, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/914,990

(22) Filed: Oct. 14, 2024

(65) Prior Publication Data

US 2026/0105106 A1 Apr. 16, 2026

(51) Int. Cl.
*G06F 16/93* (2019.01)
*G06F 16/23* (2019.01)

(52) U.S. Cl.
CPC .......... *G06F 16/93* (2019.01); *G06F 16/2322* (2019.01); *G06F 16/2358* (2019.01); *G06F 16/2379* (2019.01)

(58) Field of Classification Search
CPC ...... G06F 16/95; G06F 16/93; G06F 16/2379; G06F 11/0709; G06F 11/0775; G06F 2201/86; G06F 9/50; G06F 16/2322; G06F 16/2358; G06F 16/2365; G06F 16/273; G06F 16/27; G06F 16/275
See application file for complete search history.

(56) References Cited

U.S. PATENT DOCUMENTS

| | | | | |
|---|---|---|---|---|
| 10,230,749 | B1 * | 3/2019 | Rostami-Hesarsorkh | G06F 21/56 |
| 2020/0012734 | A1 * | 1/2020 | Lee | G06F 16/2379 |
| 2021/0011898 | A1 * | 1/2021 | Lee | G06F 16/27 |
| 2023/0306011 | A1 * | 9/2023 | Jimenez Peris | G06F 16/2329 |
| 2024/0111608 | A1 * | 4/2024 | Brown | G06F 9/546 |

* cited by examiner

*Primary Examiner* — Marcin R Filipczyk
(74) *Attorney, Agent, or Firm* — Sterne, Kessler, Goldstein & Fox P.L.L.C.

(57) ABSTRACT

Disclosed herein are system, method, and computer program product embodiments for maintaining document counts in a distributed system. An embodiment operates by receiving a document count query for a data store, the query being associated with a time stamp and a system session currently interacting with the data store. A plurality of commits to the data store that have been committed between the query time stamp and a base time stamp corresponding to a base commit is then determined. A plurality of net document counts corresponding to the determined plurality of commits is then retrieved from a record table. The retrieved net document counts are then aggregated with the net document count corresponding to the system session currently interacting with the data store. A document count for the data store for the system session is then obtained.

21 Claims, 4 Drawing Sheets

200

| | 202 | 204 | 206 | 208 |
|---|---|---|---|---|
| Session ID | Base | 1000 | 1001 | 1002 |
| Creation Time Stamp | 1 | 9000 | 9000 | 9010 |
| Record Change | 7000 | +30 | +20 | +80 |
| Status | COMMITTED | COMMITTED | RUNNING | RUNNING |
| Commit Time Stamp | 3333 | 9005 | - | - |

FIG. 2

MAINTAINING DOCUMENT COUNT IN A DISTRIBUTED SYSTEM

BACKGROUND

As technology evolves, organizations have begun to adopt distributed database systems into their networks. These systems allow for convenient and scalable handling of data across multiple servers. However, despite these advancements, the fundamental operation of document counting remains surprisingly challenging and unoptimized. Document counting typically requires the loading and scanning of entire collections stored on a distributed database system. These loading processes become computationally expensive and time-consuming tasks, especially for larger environments that can have millions of documents. Further, these systems also allow users to concurrently access the database and modify its data. As such, document counts may become inconsistent across different sessions.

BRIEF DESCRIPTION OF THE DRAWINGS

The accompanying drawings are incorporated herein and form a part of the specification.

FIG. 2 illustrates an example record table, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
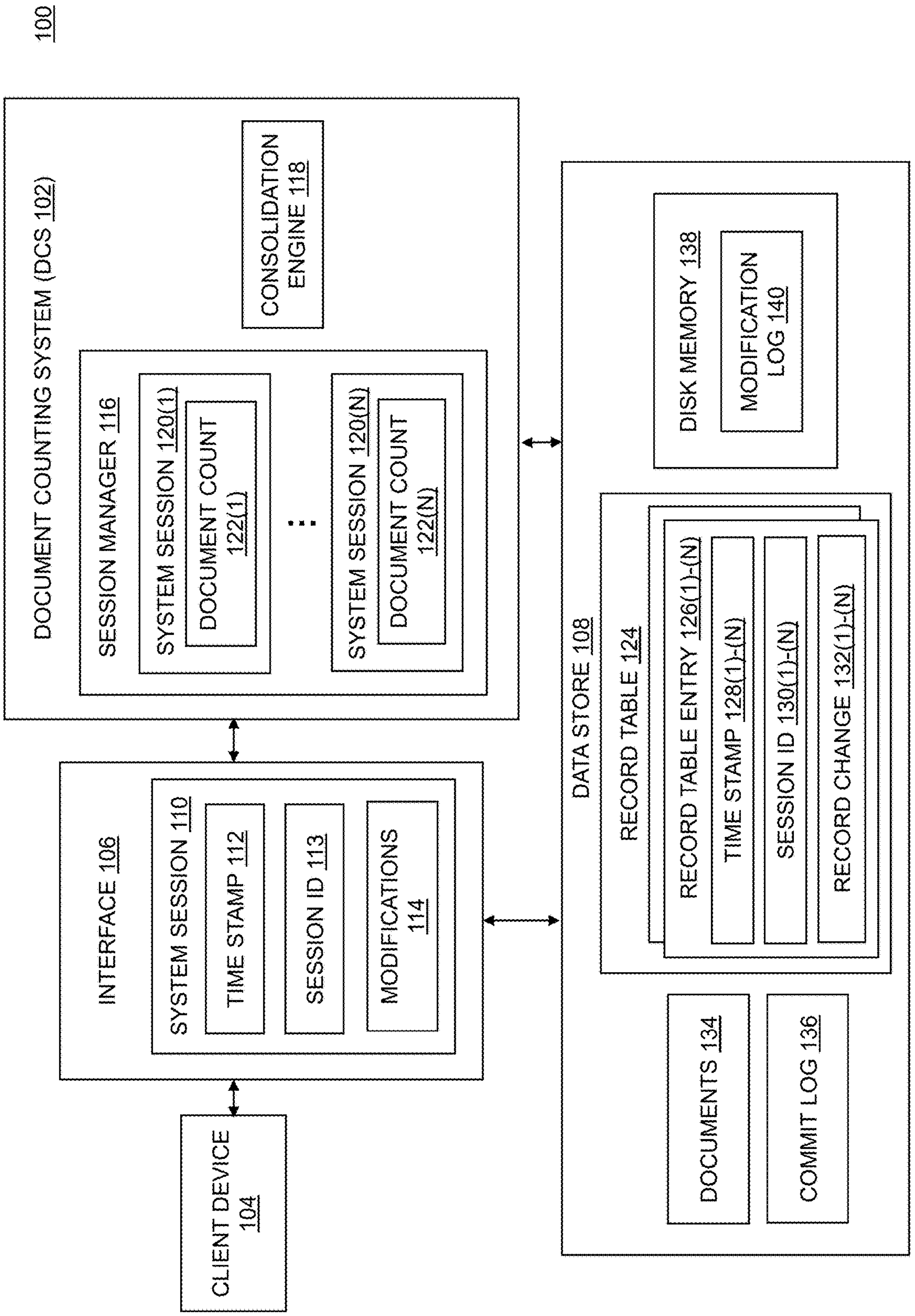
FIG. 1 illustrates an example block diagram of an environment for maintaining document counts, according to some embodiments.

Provided herein are system, apparatus, device, method and/or computer program product embodiments, and/or combinations and sub-combinations thereof, for maintaining document counts in a distributed system.

As technology evolves, organizations have begun to adopt distributed database systems for their networks. These systems allow for convenient and scalable handling of data across multiple servers. However, despite these advancements, the fundamental operation of document counting remains surprisingly challenging and unoptimized. Document counting typically requires the loading and scanning of entire collections stored on a distributed database system. These loading processes become computationally expensive and time-consuming tasks, especially for larger environments that can have millions of documents. Further, these systems also allow users to concurrently access the database and modify its data. As such, document counts may become inconsistent across different sessions.

These factors introduce the technical problems of excessive I/O operations, increased network traffic, and wasted CPU usage. Moreover, users have an interest in obtaining the document count quickly. This is not only true for a typical SELECT COUNT(*) query on the data to count the number of documents, but also in monitoring views that help administrators to obtain insights into general database usage and space consumption. As discussed above, the loading and scanning of entire document collections per query are highly compute intensive tasks. Additionally, identical load or scan operations may be repeated during these processes, for example, when two separate queries wish to obtain document counts for the same collection of documents. These technical problems are further complicated by requirements for distributed database systems to maintain transactional visibility across different sessions. Different sessions interacting with the database and performing modifications in real time need to view their modifications in a timely and accurate manner. However, these modifications may have not been committed to the database yet, and are thus unable to be loaded and scanned.

System, apparatus, device, method and/or computer program product embodiments here solve these technological problems by introducing a record table data structure and management process thereof into a distributed database system. Such techniques may leverage data processing and communication techniques to achieve this purpose, thereby solving an unoptimized task and delivering more value to the customer base interacting with the distributed database system.

For example, a document counting system (DCS) may receive a document count query for a data store, the query being associated with a time stamp and a system session currently interacting with the data store. The DCS may then determine a plurality of commits to the data store that were committed between the query time stamp and a base time stamp corresponding to a base commit. The DCS may then retrieve, from the record table, a plurality of net document counts corresponding to the plurality of commits between the query time stamp and the base time stamp. The DCS may then aggregate the retrieved net document counts with the net document count corresponding to the system session currently interacting with the data store. The DCS may then obtain a document count for the data store for the system session as a result of the aggregating.

The techniques described herein improve the functioning of a computing system. For example, accessing and maintaining a record table improves computing efficiency over loading and scanning entire document collections. As such, various compute resources (e.g., processor cycles, memory, storage, etc.) that are normally consumed executing prior queries are conserved as a result.

FIG. 1 illustrates an example block diagram of an environment 100 for maintaining document counts, according to some embodiments. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

In some embodiments, environment 100 may include a document counting system (DCS) 102, a client device 104, an interface 106, and a data store 108. As shown in FIG. 1, DCS 102 may include a session manager 116 and a consolidation engine 118. Session manager 116 may include one or sessions, namely system session 120(1)-(N), each of which including a document count 122(1)-(N) respectively. Interface 106 may include a system session 110. System session 110 may include a time stamp 112, session ID 113, and modifications 114. Data store 108 may include a record table 124, documents 134, a commit log 136, and a disk memory 138. Record table 124 may include record table entry 126(1)-(N), each of which including time stamp 128 (1)-(N), session ID 130(1)-(N), and record change 132(1)-(N). Disk memory 138 may include a modification log 140.

In some embodiments, DCS 102 may be implemented as one or more servers and/or one or more cloud servers. DCS 102 may also be implemented as a variety of centralized or decentralized computing devices. For example, DCS 102 may be a mobile device, a laptop computer, a desktop computer, grid-computing resources, a virtualized computing resource, cloud computing resources, peer-to-peer distributed computing devices, a server farm, or a combination thereof. DCS 102 may be centralized in a single device, distributed across multiple devices within a cloud network, distributed across different geographic locations, or embedded within a network. DCS 102 may communicate with other devices, such as client device 104.

In some embodiments, an entity (e.g. a business user, a customer, a system administrator, etc.) of an organization, such as an enterprise or business, may wish to make modifications to data store 108. The entity may leverage client device 104 to interact with data store 108 using interface 106. To accomplish this, client device 104 may create system session 110 with time stamp 112 denoting a creation time of the system session. In some embodiments, system session 110 may be a transaction or transactional view. System session 110 may also be given session ID 113 to uniquely distinguish system session 110 from other system sessions that have been created. Within system session 110, the entity may make modifications 114 to data store 108, for example, by creating and adding documents to data store 108 or removing existing documents from data store 108 via a user interface. For simplicity, one client device 104 and one interface 106 are illustrated; however, data store 108 (and DCS 102) may interact with many client devices and interfaces corresponding to all active sessions that concurrently have access to and/or are making modifications to data store 108.

While system session 110 is active, interface 106 may display a current document count corresponding to system session 110. In some embodiments, interface 106 may communicate with DCS 102 to obtain the correct document count for system session 110 to then be displayed. In some embodiments, DCS 102 may employ session manager 116 to maintain the document counts of all active system sessions, e.g. system session 120(1)-(N). For example, system session 110 may correspond to system session 120(1) with document count 122(1). In this example, DCS 102 may communicate document count 122(1) to interface 106 to then be displayed on a user interface.

In some embodiments, after making any necessary modifications 114, client device may close system session 110 and commit modifications 114 to data store 108. Interface 106 may commit modifications 114 to data store 108 by writing modifications 114 into the memory of data store 108 and adding an entry to commit log 136 with a commit time stamp and session ID 113.

Data store 108 may represent a data store that stores documents 134, commit log 136, record table 124, and disk memory 138. Data store 108 may be stored, for example, in a volatile memory (e.g. random access memory (RAM)), a non-volatile storage device (e.g. a disk), or in a distributed and/or redundant manner across multiple memories and/or storage devices. In an embodiment, data store 108 is managed by and accessed via a corresponding database management system (DBMS), which is not shown in FIG. 1 for the sake of simplicity. Data store 108 and the corresponding DBMS may be implemented on one or more computer systems, such as computer system 400 as described below in reference to FIG. 4. Data store 108 and the corresponding DBMS may also be implemented on one or more servers of an enterprise network and/or a cloud computing network and accessed via a client computer system that is connected thereto, although these examples are not intended to be limiting.

Documents 134 may include one or more collections of documents stored in data store 108. In some embodiments, documents 134 may be stored in a document store (not shown) within data store 108. Data store 108 may include any set of memory, databases, servers, or other storage devices that store data, such as documents 134. In some embodiments, documents 134 may include JSON (Javascript Objection Notation) formatted documents. JSON is an example of a data format that allows for data exchange and communications between different devices, such as mobile devices operating on web applications and servers. In some embodiments, documents 134 may be sorted or arranged into different subsets, and each subset may have its own unique storage format. In some embodiments, JSON data may be stored in slices in data store 108. Slices are an internal mechanism to organize large quantities of data.

Documents 134 may also be implemented using a schema-less storage component for managing graph data in a JSON format, where graph data may be stored in JSON documents. In some embodiments, each JSON document may be implemented to represent a distinct node or edge in a heterogeneous graph. In some embodiments, each JSON document may also include attributes which may be utilized to capture properties associated with nodes and edges. Examples of properties of nodes may include, but are not limited to, node labels, node identifiers, node names, and node creation timestamps, and node modification timestamps. Examples of properties of edges may include, but are not limited to, edge identifiers, edge labels, edge weights, edge directions, edge creation timestamps, and edge modification timestamps.

Record table 124 may tabulate the net document counts of all system sessions that have interacted with data store 108. In some embodiments, record table 124 may include all currently active system sessions and system sessions whose changes have since been committed to data store 108. Record table 124 may store the net document counts for each system session within a record table entry 126(1)-(N). Each record table entry 126(1)-(N) may include a respective time stamp 128(1)-(N), session ID 130(1)-(N), and record change 132(1)-(N).

In some embodiments, time stamp 128(1)-(N) may be the time stamp at which a system session was created (e.g., a creation time stamp). Time stamp 128(1)-(N) may also be the time stamp at which a system session had committed its modifications to data store 108 (i.e., a commit time stamp). In some embodiments, record table 124 may also store a status field indicating whether the modifications corresponding to the record table entry have been committed to data store 108. In some embodiments, time stamp 128(1)-(N) may include both the creation time stamp and the commit time stamp for a system session.

Record change 132(1)-(N) may refer to the net document count corresponding to each record table entry 126(1)-(N). For example, record change 132(1) may refer to the number of documents that the system session with session ID 130(1) has added to document store 108 minus the number of documents that the system session with session ID 130(1) has removed from document store 108. Similar to time stamp 128(1)-(N), record change 132(1)-(N) may denote a net document count of a currently active system session in some embodiments. Record change 132(1)-(N) may also denote a net document count of document modifications that have been committed to data store 108.

After every modification or statement made by an active system session to data store 108, DCS 102 may update the corresponding record table entry for the active system session. For example, after system session 110 has been initiated, client device 104 may add ten documents to data store 108. DCS 102 may update record change 132(1) to "+10", indicating the net positive of ten documents added to data store 108. After some while, client device 104 may remove five documents from data store 108. Then DCS 102 may update record change 132(1) to "+5", indicating an overall net positive of five documents added to data store 108.

In some embodiments, record table 124 may include a base record table entry. The base record table entry may denote a base commit with consolidated net document counts for documents 134 up until a certain point in time. In some embodiments, this certain point of time may be the time stamp of any system session commit before the oldest active system session. This is because the consolidated net document counts of the base record table entry may be accessed by DCS 102 when updating document counts, including the document count of the oldest active system session. As such, the base record table entry should not consolidate any record changes 132(1)-(N) past the time stamp of the oldest active system session. In some embodiments, the base record table entry may be treated as the beginning of time and therefore given a time stamp of "1". In some embodiments, the base record table entry may be updated at regular intervals. This may reduce the computations needed to be performed by DCS 102 when tabulating document counts 122(1)-(N).

Disk memory 138 may be non-volatile persistent memory stored inside data store 108 for storing modification log 140. To enable quick read and write capability, record table 124 may be implemented using volatile memory. However, in the event of a database crash, the data stored inside record table 124 may be lost. As such, any future query may first need to trigger a reloading and scanning of all document collections to repopulate record table 124. Writing each modification to data store 108 inside modification log 140, which is stored on persistent memory, may avoid this situation and enable efficient document counting by DCS 102.

As such, in some embodiments, after every modification or statement made by an active system session, DCS 102 may document the modification inside modification log 140, in addition to updating record table 124 as described above. In some embodiments, modification log 140 may be an append-only data structure. For example, after system session 110 has been initiated, client device 104 may add ten documents to data store 108. DCS 102 may then update record change 132(1) to "+10" and write "+10" into modification log 140 along with session ID 130(1) and time stamp 128(1). If client device 104 removes 5 documents from data store 108, DCS 102 may update record change 132(1) to "+5" but write "−5" into modification log 140 along with session ID 130(1) and time stamp 128(1).

In some embodiments, DCS 102 may perform periodic consolidation on the contents within modification log 140 into write checkpoints. This periodic consolidation may be helpful so DCS 102 may perform fewer computations when re-tallying the net document counts for each system session and record table entry 126(1)-(N). In some embodiments, this periodic consolidation of modification log 140 may be initiated at less frequent intervals than the consolidation of the base record table entry in record table 124. This is because disk memory 138 may not need to be restarted as often as data store 108 or DCS 102. For example, disk memory 138 may need to be restarted when performing a system-wide update. After a database crash or restart, DCS 102 may read from modification log 140 to repopulate record table 124 as part of a loading operation. DCS 102 may initialize record table 124 using the latest write checkpoint and iterate through the remaining list of modifications in modification log 140 to determine and write the correct and updated record changes 132(1)-(N) into record table 124.

Commit log 136 may document all the commits made to data store 108 during active system sessions. In some embodiments, writing to commit log 136 may be an atomic operation. As part of this process, an entry in commit log 136 may include a commit time stamp denoting the time the commit took place and the session ID that initiated the commit.

Consolidation engine 118 may perform various consolidation tasks within environment 100. In some embodiments, consolidation engine 118 may aggregate one or more record changes (e.g., record change 132(1)-(N)) to obtain a document count (e.g., document count 122(N)) for an active system session (e.g., system session 120(N) and/or system session 110). In some embodiments, consolidation engine 118 may first aggregate record changes of one or more record table entries corresponding to commits occurring before time stamp 112 to obtain a first aggregated value. Consolidation engine 118 may then aggregate the first aggregated value with a record change of a record table entry corresponding to system session 110, a currently active system session, to obtain a document count for system session 110. Alternatively or in addition, consolidation engine 118 may consolidate a base record table entry in record table 124 or modification log 140 using the methods described herein.

FIG. 2 illustrates an example record table 200, according to some embodiments. In FIG. 2, record table 200 may be an example of record table 124 (of FIG. 1). Each column of record table 200 may depict one or more record table entries, with a respective session ID, creation time stamp, record change, and status field. For example, record table 200 may include a base record table entry 202 with session ID "Base." Base record table entry 202 may represent a base commit used by DCS 102 when obtaining document counts. As illustrated in FIG. 2, base record table entry 202 may include a creation time stamp of "1," a record change of "7000" documents, a status of "COMMITTED," and a commit time stamp of "3333."

Record table 200 may include record table entry 204, with a session ID of "1000," a creation time stamp of "9000," a record change of "+30," a status of "COMMITTED," and a commit time stamp of "9005." Record table 200 may also include record table entry 206, with a session ID of "1001," a creation time stamp of "9000," a record change of "+20," a status of "RUNNING," and an empty commit time stamp. Record table 200 may also include record table entry 208, with a session ID of "1002," a creation time stamp of "9010," a record change of "+80," a status of "RUNNING," and an empty commit time stamp.

Record table entry 204 and record table entry 206 may correspond to system sessions that were created at the same time, since they share the same creation time stamp, "9000."

In some embodiments, a system session may only view data in data store 108 whose commit time stamps are lower than the creation time stamp of the system session. As such, because the commit time stamp of system session "1000" is higher than the creation time stamp of system session "1001," system session "1001" may not be able to view the committed changes made by system session "1000." System session "1001" may only be able to view the changes reflected by base record table entry 202. Accordingly, the document count for system session "1001" obtained by DCS 102 should be "7000".

However, since the creation time stamp of system session "1002" is higher than the commit time stamp of system session "1000," system session "1002" may be able to view the changes committed by system session "1000." As such, the document count for system session "1002" obtained by DCS 102 should be "7030."

As with the example described in FIG. 2, a specific record table examples have been described herein. However, these examples are not meant to represent an exhaustive list of possible implementations. The scope of the technology disclosed herein is not limited to only these examples.

Figure 3:
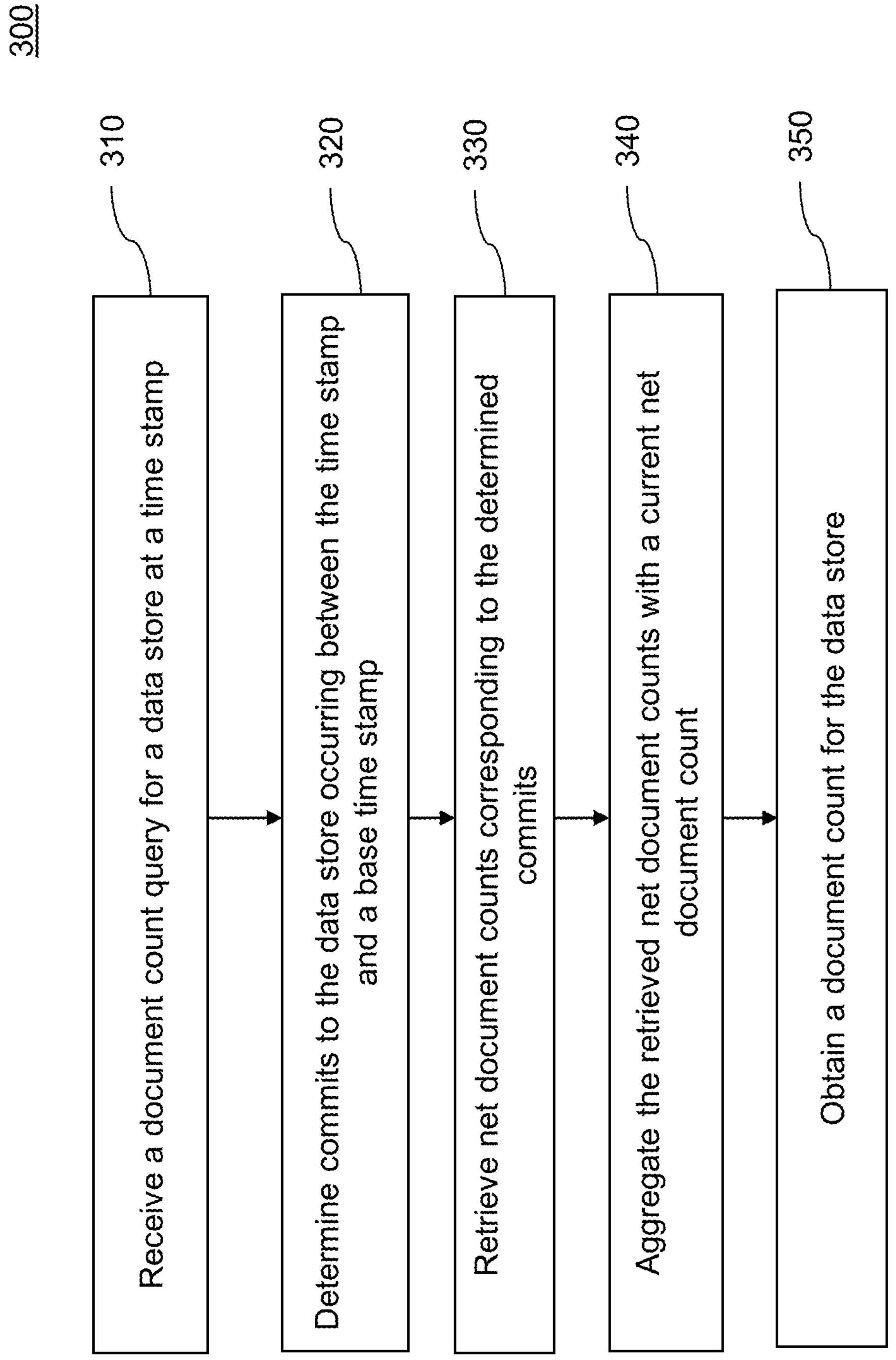
FIG. 3 illustrates an example flow diagram of a method for maintaining document counts in a distributed system, according to some embodiments.

FIG. 3 illustrates an example flow diagram of a method 300 for maintaining document counts in a distributed system that can be carried out in line with the discussion above, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Further, method 200 may not include all the steps illustrated.

Method 300 shall be described with reference to FIGS. 1 and 2. However, method 300 is not limited to those example embodiments. One or more of the operations in the method depicted by FIG. 3 could be carried out by one or more entities, including, without limitation, DCS 102, interface 106, other server or cloud-based server processing systems and/or one or more entities operating on behalf of or in cooperation with these or other entities. One or more of the operations in the method depicted by FIG. 3 could also be carried out by one or more servers of an enterprise network and/or a cloud computing network and accessed via a client computer system that is connected thereto. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations.

In 310, DCS 102 may receive a document count query for a data store at a time stamp. For example, DCS 102 may receive a document count query for data store 108 from client device 104 via interface 106. The document query may be associated with time stamp 112 of system session 110, a currently active system session. Time stamp 112 may be a creation time stamp describing a time that the system session was initially created. System session 110 may correspond to a system session 120(1)-(N) managed by session manager 116 of DCS 102. In some embodiments, the document count query may specify a document count for an edge count and/or a vertex count, for example, in the case where documents 134 are stored using a graph data structure.

In 320, DCS 102 may determine commits to the data store occurring between the time stamp and a base time stamp. For example, DCS 102 may identify a plurality of commits within commit log 136 with commit time stamps that are lower than time stamp 112. DCS 102 may continue identifying commits until a base commit in commit log 136 is reached. In some embodiments DCS 102 may also identify a plurality of committed record table entries 126(1)-(N) within record table 124 (e.g., record table entries with a status of "COMMITTED," as depicted in FIG. 2) with commit time stamps lower than time stamp 112. DCS 102 may continue identifying committed record table entries until a base record table entry is reached (e.g., base record table entry 202).

In 330, DCS 102 may retrieve net document counts corresponding to the determined commits. For example, DCS 102 may iterate over record table 124 and obtain record table entries 126(1)-(N) corresponding to the commits determined in 320. DCS 102 may then obtain record changes 132(1)-(N) from the obtained record table entries 126(1)-(N). DCS 102 may also directly obtain record changes 132(1)-(N) using the identified plurality of committed record table entries 126(1)-(N) in 320.

In 340, DCS 102 may aggregate the retrieved net document counts with a current net document count. For example, DCS 102 may leverage consolidation engine 118 to aggregate record changes 132(1)-(N) obtained in 330 and the record change corresponding to a currently active system session (e.g., system session 110). In some embodiments, only record changes 132(1)-(N) obtained in 330 may be aggregated. For example, this may be the case when a received document count query is not associated with a currently active system session but is rather directed to a more general database view.

In 350, DCS 102 may obtain a document count for the data store. For example, DCS 102 may obtain document count 122(N) for system session 110 based on the aggregated values. In some embodiments, document count 122(N) may then be displayed on interface 106.

In some embodiments, DCS 102 may perform periodic consolidation on record table 124. For example, DCS 102 may consolidate record table entries 126(1)-(N) into a base record table entry corresponding to a base commit. DCS 102 may determine a cutoff commit to the data store. The cutoff commit may represent a new base commit for record table 124. A record table entry corresponding to a new base commit for record table 124 may have a time stamp preceding a second system session. The second system session may be the longest running active system session. DCS 102 may then leverage consolidation engine 118 to consolidate all the committed record table entries between the old base commit and the new base commit. DCS 102 may then update the new base time stamp to be treated as the beginning of time and/or write a time stamp of "1."

Figure 4:
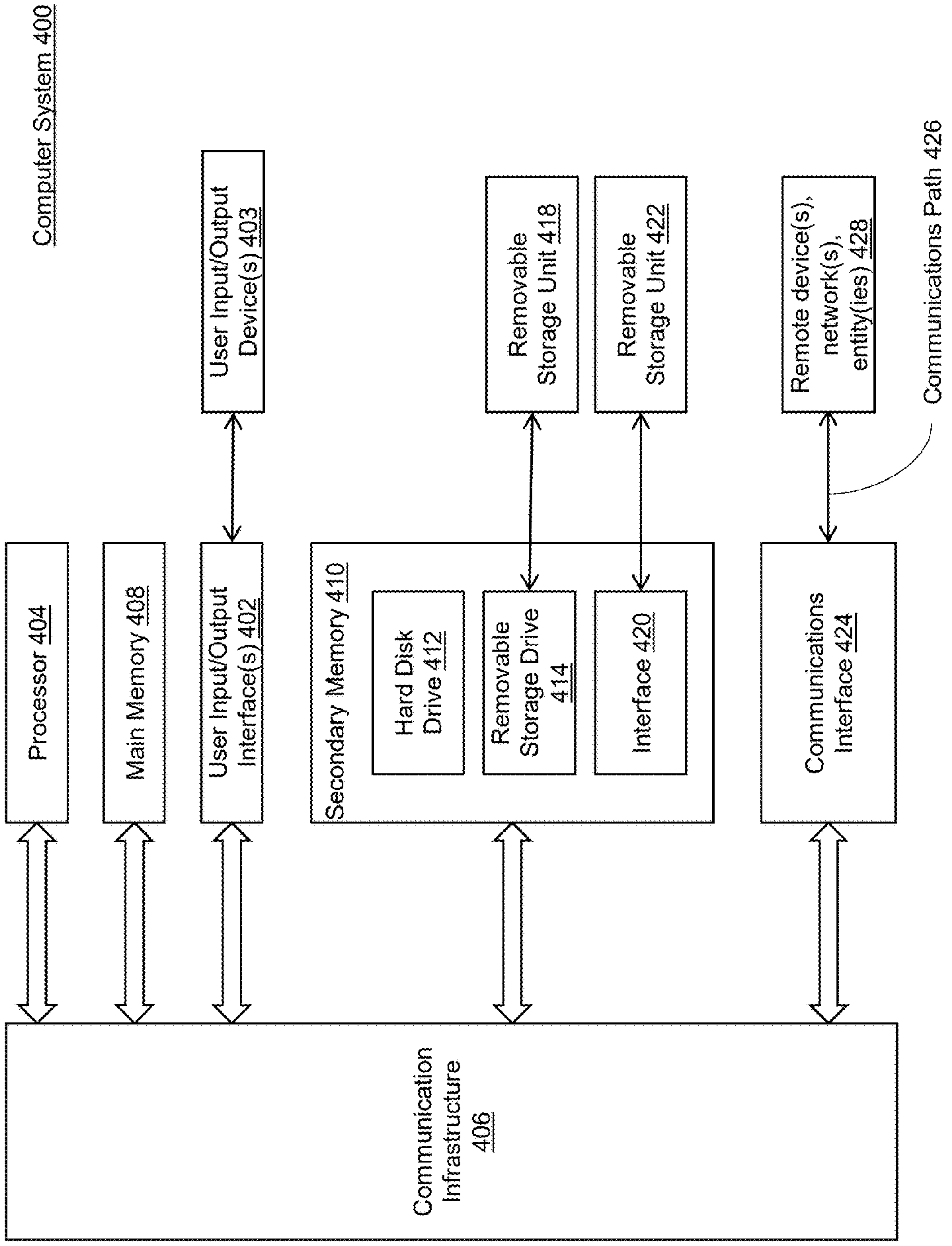
FIG. 4 illustrates an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for maintaining document counts in a distributed database system, comprising:

receiving, by one or more processors and from a client device associated with an active system session of the distributed database system, a document count query for documents stored in the distributed database system;

responsive to the receiving, processing the document count query on the distributed database system without loading and scanning the documents stored in the distributed database system by:

identifying, from a commit log of the distributed database system, a plurality of commits to the distributed database system occurring between a creation time stamp corresponding to a creation time of the active system session and a base time stamp corresponding to a base commit, wherein the commit log stores a plurality of commit log entries, each commit log entry corresponding to a respective commit to the distributed database system and including a respective commit time stamp and a respective session identifier associated with a respective system session;

retrieving, from a record table of the distributed database system, a plurality of net document counts corresponding to the plurality of commits, wherein the record table stores a plurality of record table entries, each record table entry including a respective commit time stamp, a respective session identifier, and a respective net document count, wherein one of the net document counts is a base count, and wherein the distributed database system is configured to periodically consolidate the base count, and the retrieving is performed by:

for each commit of the plurality of commits:

matching a respective commit time stamp and a respective session identifier of a respective commit log entry corresponding to the commit with a respective commit time stamp and a respective session identifier of a respective record table entry; and retrieving a respective net document count from the respective record table entry;

summing the retrieved plurality of net document counts with a net document count corresponding to the active system session; and obtaining a document count for the distributed database system corresponding to the active system session as a result of the summing.

2. The computer-implemented method of claim 1, further comprising:

determining a cutoff commit to a data store, wherein the cutoff commit has a second time stamp that precedes a second system session;

consolidating a second plurality of net document counts into a record table entry for the cutoff commit, wherein each of the second plurality of net document counts corresponds to a second plurality of commits committed between the base time stamp and the second time stamp; and updating the base time stamp with the second time stamp.

3. The computer-implemented method of claim 1, further comprising:

updating a record table entry for the active system session responsive to a modification to the distributed database system during the active system session.

4. The computer-implemented method of claim 1, further comprising:

committing a modification to the distributed database system corresponding to the active system session into the commit log;

writing a net document count resulting from the modification into the record table; and persisting the net document count resulting from the modification onto a modification log stored on a disk memory.

5. The computer-implemented method of claim 4, further comprising:

periodically consolidating the modification log into a write checkpoint.

6. The computer-implemented method of claim 5, further comprising:

repopulating the record table using the modification log as part of a loading operation.

7. The computer-implemented method of claim 1, wherein:

the distributed database system comprises a graph data structure, and the plurality of net document counts each comprise a net edge count and a net vertex count for the graph data structure.

8. The computer-implemented method of claim 1, wherein the commit log includes three commits corresponding to three system sessions, and wherein the record table includes three record table entries corresponding to the three commits.

9. A distributed database system for maintaining document counts, comprising:

one or more memories comprising a record table; and at least one processor each coupled to at least one of the memories and configured to perform operations comprising:

receiving, from a client device associated with an active system session of the distributed database system, a document count query for documents stored in the distributed database system;

responsive to the receiving, processing the document count query on the distributed database system without loading and scanning the documents stored in the distributed database system by:

identifying, from a commit log of the distributed database system, a plurality of commits to the distributed database system occurring between a creation time stamp corresponding to a creation time of the active system session and a base time stamp corresponding to a base commit, wherein the commit log stores a plurality of commit log entries, each commit log entry corresponding to a respective commit to the distributed database system and including a respective commit time stamp and a respective session identifier associated with a respective system session;

retrieving, from the record table, a plurality of net document counts corresponding to the plurality of commits, wherein the record table stores a plurality of record table entries, each record table entry including a respective commit time stamp, a respective session identifier, and a respective net document count, wherein one of the net documents counts is a base count, and wherein the at least one processor is further configured to periodically consolidate the base count, and the retrieving is performed by:

for each commit of the plurality of commits:

matching a respective commit time stamp and a respective session identifier of a respective commit log entry corresponding to the commit with a respective commit time stamp and a respective session identifier of a respective record table entry; and retrieving a respective net document count from the respective record table entry;

summing the retrieved plurality of net document counts with a net document count corresponding to the active system session; and obtaining a document count for the distributed database system corresponding to the active system session as a result of the summing.

10. The distributed database system of claim 9, the operations further comprising:

determining a cutoff commit to a data store, wherein the cutoff commit has a second time stamp that precedes a second system session;

consolidating a second plurality of net document counts into a record table entry for the cutoff commit, wherein each of the second plurality of net document counts corresponds to a second plurality of commits committed between the base time stamp and the second time stamp; and updating the base time stamp with the second time stamp.

11. The distributed database system of claim 9, the operations further comprising:

updating a record table entry for the active system session responsive to a modification to the distributed database system during the active system session.

12. The distributed database system of claim 9, wherein the one or more memories further comprise a disk memory, the operations further comprising:

committing a modification to the distributed database system corresponding to the active system session into the commit log;

writing a net document count resulting from the modification into the record table; and persisting the net document count resulting from the modification onto a modification log stored on the disk memory.

13. The distributed database system of claim 12, the operations further comprising:

periodically consolidating the modification log into write checkpoints.

14. The distributed database system of claim 13, the operations further comprising:

repopulating the record table using the modification log as part of a loading operation.

15. The distributed database system of claim 9, wherein:

the distributed database system comprises a graph data structure, and the plurality of net document counts each comprise a net edge count and a net vertex count for the graph data structure.

16. A non-transitory computer-readable medium having instructions stored thereon that, when executed by at least one computing device, causes the at least one computing device to perform operations for maintaining document counts in a distributed database system, the operations comprising:

receiving, from a client device associated with an active system session of the distributed database system, a document count query for documents stored in the distributed database system;

responsive to the receiving, processing the document count query on the distributed database system without loading and scanning the documents stored in the distributed database system by:

identifying, from a commit log of the distributed database system, a plurality of commits to the distributed database system occurring between a creation time stamp corresponding to a creation time of the active system session and a base time stamp corresponding to a base commit, wherein the commit log stores a plurality of commit log entries, each commit log entry corresponding to a respective commit to the distributed database system and including a respective commit time stamp and a respective session identifier associated with a respective system session;

retrieving, from a record table of the distributed database system, a plurality of net document counts corresponding to the plurality of commits, wherein the record table stores a plurality of record table entries, each record table entry including a respective commit time stamp, a respective session identifier, and a respective net document count, wherein one of the net document counts is a base count, and wherein the distributed database system is configured to periodically consolidate the base count, and the retrieving is performed by:

for each commit of the plurality of commits:

matching a respective commit time stamp and a respective session identifier of a respective commit log entry corresponding to the commit with a respective commit time stamp and a respective session identifier of a respective record table entry; and retrieving a respective net document count from the respective record table entry;

summing the retrieved plurality of net document counts with a net document count corresponding to the active system session; and obtaining a document count for the distributed database system corresponding to the active system session as a result of the summing.

17. The non-transitory computer-readable medium of claim 16, the operations further comprising:

determining a cutoff commit to a data store, wherein the cutoff commit has a second time stamp that precedes a second system session;

consolidating a second plurality of net document counts into a record table entry for the cutoff commit, wherein each of the second plurality of net document counts corresponds to a second plurality of commits committed between the base time stamp and the second time stamp; and updating the base time stamp with the second time stamp.

18. The non-transitory computer-readable medium of claim 16, the operations further comprising:

updating a record table entry for the active system session responsive to a modification to the distributed database system during the active system session.

19. The non-transitory computer-readable medium of claim 16, the operations further comprising:

committing a modification to the distributed database system corresponding to the active system session into the commit log;

writing a net document count resulting from the modification into the record table; and persisting the net document count resulting from the modification onto a modification log stored on a disk memory.

20. The non-transitory computer-readable medium of claim 19, the operations further comprising:

periodically consolidating the modification log into write checkpoints.

21. The non-transitory computer-readable medium of claim 20, the operations further comprising:

repopulating the record table using the modification log as part of a loading operation.

* * * * *